United States Patent
Jin et al.

(10) Patent No.: US 10,038,364 B2
(45) Date of Patent: *Jul. 31, 2018

(54) RIPPLE FILTER CIRCUIT AND RIPPLE FILTER METHOD

(71) Applicant: Silergy Semiconductor Technology (Hangzhou) LTD, Hangzhou, ZheJiang Province (CN)

(72) Inventors: Jin Jin, Hangzhou (CN); Hongbin Lai, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/401,219

(22) Filed: Jan. 9, 2017

(65) Prior Publication Data

US 2017/0117796 A1    Apr. 27, 2017

Related U.S. Application Data

(63) Continuation of application No. 14/833,062, filed on Aug. 22, 2015, now Pat. No. 9,564,795.

(30) Foreign Application Priority Data

Aug. 22, 2014    (CN) .......................... 2014 1 0415783

(51) Int. Cl.
*H02M 1/14*    (2006.01)
*H02M 1/15*    (2006.01)
*H02M 3/335*    (2006.01)

(52) U.S. Cl.
CPC ............. *H02M 1/143* (2013.01); *H02M 1/15* (2013.01); *H02M 3/33507* (2013.01)

(58) Field of Classification Search
CPC ...... H02M 1/14; H02M 1/15; H02M 3/33507; H05B 33/0815; H05B 33/0818;
(Continued)

(56) References Cited

U.S. PATENT DOCUMENTS 7,495,939 B2    2/2009  Kimura
8,674,621 B2*   3/2014  Ge ..................... H05B 33/0812
                                              315/209 R
(Continued)

FOREIGN PATENT DOCUMENTS

CN    102130577 A    7/2011
CN    102545599 A    7/2012

*Primary Examiner* — Emily P Pham
(74) *Attorney, Agent, or Firm* — Michael C. Stephens, Jr.

(57) ABSTRACT

A method of filtering a ripple can include: (i) generating, by a sampling circuit, a sense voltage signal that represents an output current flowing through a load; (ii) generating, by a filter circuit, a filter voltage signal by filtering the sense voltage signal, where the filter circuit includes a switch capacitor circuit and a filter capacitor; and (iii) generating, by an error amplifying circuit, an error compensation signal by amplifying a difference between the sense voltage signal and the filter voltage signal, where the error compensation signal is configured to compensate and regulate the output current flowing through the load by controlling a power switch that is coupled to the load and the sampling circuit.

20 Claims, 8 Drawing Sheets

(58) Field of Classification Search
CPC ........................ H05B 33/0803; H05B 33/0827; H05B 41/28; H05B 41/2828; H05B 37/029; H05B 37/0254
See application file for complete search history.

(56) References Cited

U.S. PATENT DOCUMENTS

| | | |
|---|---|---|
| 8,885,376 B2 | 11/2014 | Meehan et al. |
| 9,306,461 B2 * | 4/2016 | Chang ............... H02M 3/33507 |
| 2006/0279968 A1 | 12/2006 | Iida |
| 2012/0025799 A1 | 2/2012 | Tournatory et al. |
| 2014/0176017 A1 | 6/2014 | Kuang et al. |

* cited by examiner

RIPPLE FILTER CIRCUIT AND RIPPLE FILTER METHOD

RELATED APPLICATIONS

This application is a continuation of the following application, U.S. patent application Ser. No. 14/833,062, filed on Aug. 22, 2015, and which is hereby incorporated by reference as if it is set forth in full in this specification, and which also claims the benefit of Chinese Patent Application No. 201410415783.X, filed on Aug. 22, 2014, which is incorporated herein by reference in its entirety.

FIELD OF THE INVENTION

The present disclosure generally relates to the field of power electronics, and more particularly to ripple filter circuits and associated methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

SUMMARY

In one embodiment, a method of filtering a ripple can include: (i) generating, by a sampling circuit, a sense voltage signal that represents an output current flowing through a load; (ii) generating, by a filter circuit, a filter voltage signal by filtering the sense voltage signal, where the filter circuit includes a switch capacitor circuit and a filter capacitor; and (iii) generating, by an error amplifying circuit, an error compensation signal by amplifying a difference between the sense voltage signal and the filter voltage signal, where the error compensation signal is configured to compensate and regulate the output current flowing through the load by controlling a power switch that is coupled to the load and the sampling circuit.

In one embodiment, a ripple filter circuit can include: (i) a sampling circuit figured to generate a sense voltage signal that represents an output current flowing through a load; (ii) a filter circuit configured to generate a filter voltage signal by filtering the sense voltage signal, where the filter circuit includes a switch capacitor circuit and a filter capacitor; and (iii) an error amplifying circuit configured to generate an error compensation signal by amplifying a difference between the sense voltage signal and the filter voltage signal, where the error compensation signal is configured to compensate and regulate the output current flowing through the load by controlling a power switch that is coupled to the load and the sampling circuit.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In a typical AC-DC driving circuit, an input AC current can be rectified to obtain a half-sine wave DC current through a rectifier bridge. The half-sine wave DC current can be converted to a DC current through a power stage circuit that is controlled by a power factor correction (PFC) constant current control circuit. However, power frequency "ripples" or small variations from a constant value can occur to a DC current that is output by an AC-DC driving circuit. As a result, the service life of a load may be shortened due to adverse effects caused by direct use of the DC current with power frequency ripples. For example, in a light-emitting diode (LED) driver, the power frequency ripples may result in "flashes," which can shorten the service life of the LEDs. Therefore, a ripple filter for the DC current of the AC-DC driving circuit may be utilized. For example, the ripple filter can include an RC filter circuit with a filter capacitor and a resistor configured as a low-pass filter in order to eliminate the ripples.

However, an output current of an AC-DC driving circuit might mainly contain a low frequency ripple of, e.g., from about 100 to about 120 Hz. Thus, a low-pass filter with a relatively large capacitance may be employed to filter the power frequency ripple of the output current. For example, if an RC low-pass filter including a resistor and a filter capacitor is used, the time constant of the RC low-pass filter may reach about 100 ms. Also for example, the capacitance of the filter capacitor can be about 100 nF when the resistance of the resistor is about 1 MΩ. However, the relatively large capacitor of about 100 nF may be difficult to integrate into a chip, and instead may be realized by discrete devices that are outside of the chip. Such discrete components can increase the cost of the low-pass ripple filter.

In one embodiment, a method of filtering a ripple can include: (i) generating, by a sampling circuit, a sense voltage signal that represents an output current flowing through a load; (ii) generating, by a filter circuit, a filter voltage signal by filtering the sense voltage signal, where the filter circuit includes a switch capacitor circuit and a filter capacitor; and (iii) generating, by an error amplifying circuit, an error compensation signal by amplifying a difference between the sense voltage signal and the filter voltage signal, where the error compensation signal is configured to compensate and regulate the output current flowing through the load by controlling a power switch that is coupled to the load and the sampling circuit.

Figure 1:
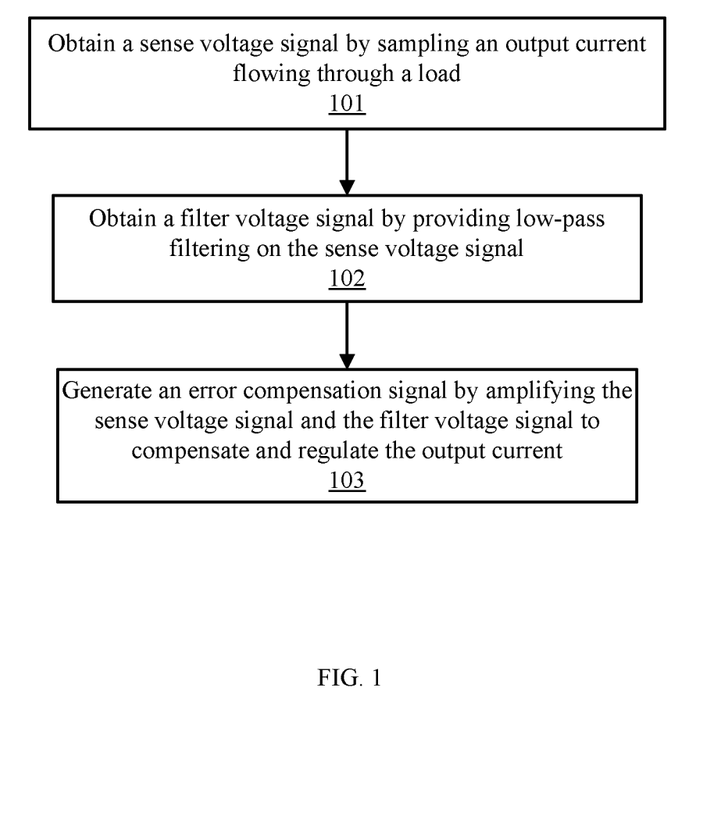
FIG. 1 is a flow diagram of an example method of controlling a filter, in accordance with embodiments of the present invention.

Referring now to FIG. 1, shown is a flow diagram of an example method of controlling a filter, in accordance with embodiments of the present invention. In this particular example, at 101, a sense voltage can be obtained by sampling an output current that flows through a load. The sense voltage signal can thus represent the current output current flowing through the load. At 102, a filter voltage signal can be obtained by filtering the sense voltage signal. The sense voltage signal can be filtered by a filter circuit connected to the sampling circuit. For example, the filter circuit can includes a filter capacitor and a switch capacitive circuit that is controlled by a clock signal. The switch capacitor circuit can effectively simulate the characteristics of a resistor, and may include a switch and a capacitor so as to be substantially equivalent to a resistor of an RC low-pass filter circuit.

In one embodiment, a ripple filter circuit can include: (i) a sampling circuit figured to generate a sense voltage signal that represents an output current flowing through a load; (ii) a filter circuit configured to generate a filter voltage signal by filtering the sense voltage signal, where the filter circuit includes a switch capacitor circuit and a filter capacitor; and (iii) an error amplifying circuit configured to generate an error compensation signal by amplifying a difference between the sense voltage signal and the filter voltage signal, where the error compensation signal is configured to compensate and regulate the output current flowing through the load by controlling a power switch that is coupled to the load and the sampling circuit.

Figure 2:
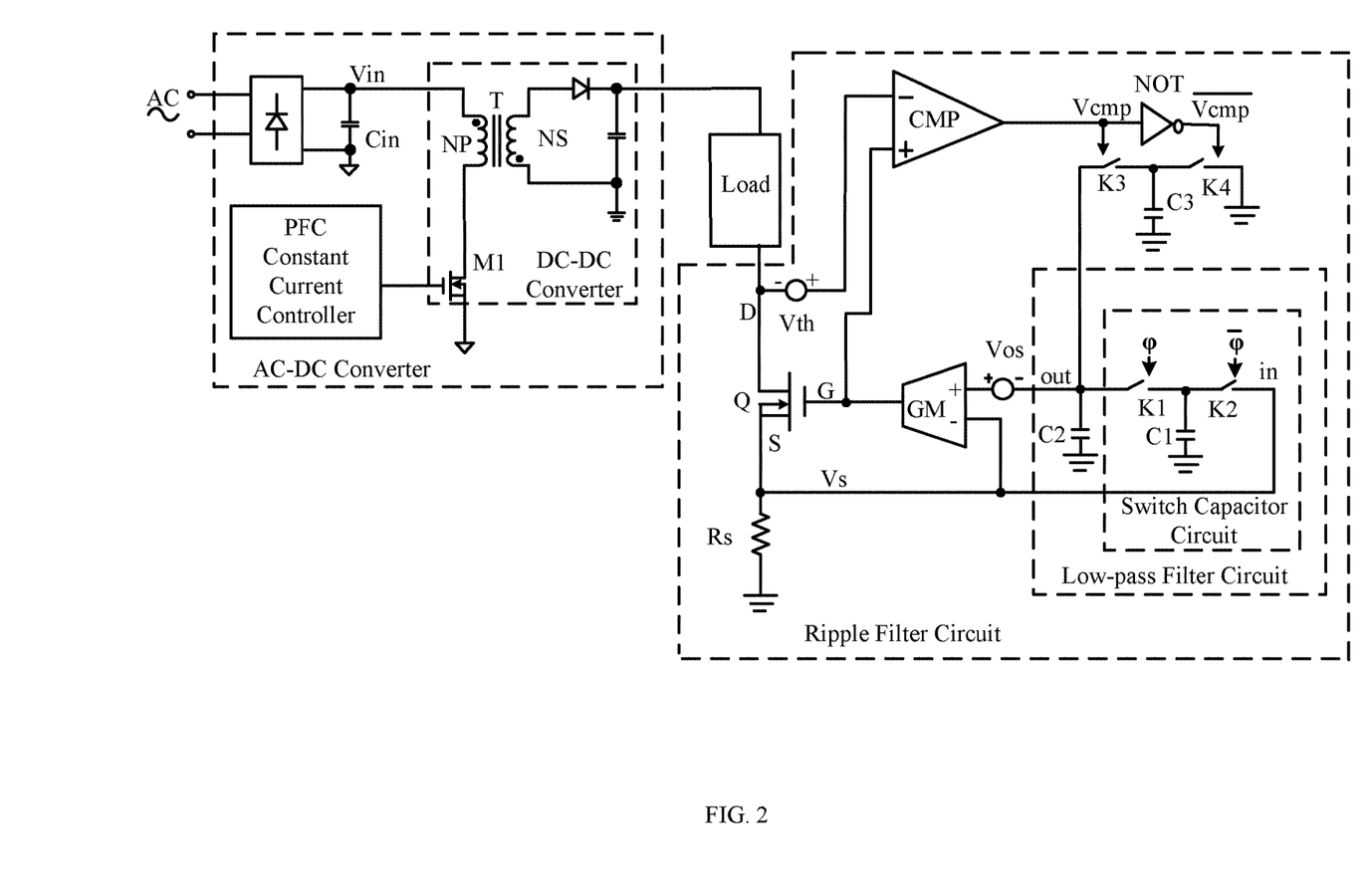
FIG. 2 is a schematic block diagram of a first example ripple filter circuit, in accordance with embodiments of the present invention.
Figure 3:
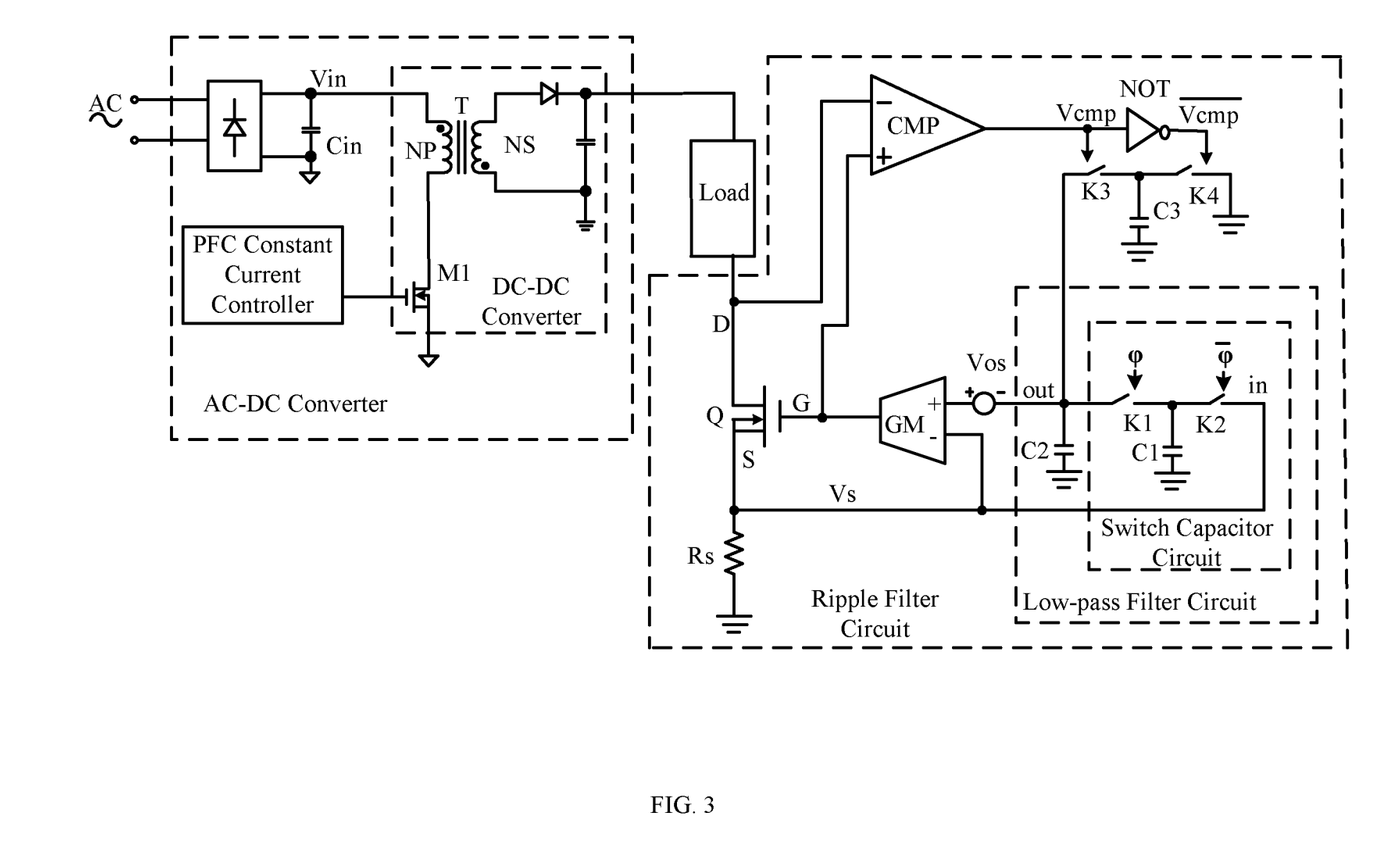
FIG. 3 is a schematic block diagram of a second example ripple filter circuit, in accordance with embodiments of the present invention.

Referring now to FIGS. 2 and 3, shown are schematic block diagrams of example ripple filter circuits, in accordance with embodiments of the present invention. In this particular example, the switch capacitor circuit can include capacitor C1, switch K1, and switch K2 connected at a common node, and capacitor C1 can also be connected to ground. Two opposite clock signals (first and second clock signals) can control switches K1 and K2. With the control of such opposite clock signals, the switching states of switches K1 and K2 may always be opposite to each other at any point time. For example, when switch K1 is on, switch K2 is off; or when switch K2 is on, switch K1 is off.

Switch K1 can connect to a first terminal of capacitor C1 and a first terminal of switch K2. A second terminal of capacitor C1 can connect to ground, and second terminals of switches K1 and K2 can be configured as two terminals of the switch capacitor circuit. Filter capacitor C2 may have a first terminal connected to ground, and a second terminal connected to the second terminal of switch K1. A common node of filter capacitor C2 and switch K1 can be configured as the output terminal out of the filter circuit. Also, the second terminal of switch K2 can be configured as the input terminal in of the filter circuit, which can connect to the output of the sampling circuit.

Figure 4:
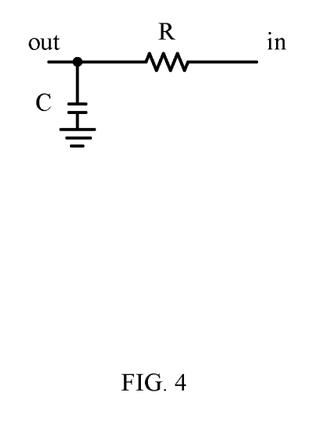
FIG. 4 is a schematic block diagram of an example RC filter circuit.

Referring also now to FIG. 4, shown is a schematic block diagram of an example RC filter circuit. In the examples of FIGS. 2 and 3, the switch capacitor circuit controlled by the first and second clock signals may be used to replace resistor R in the RC filter circuit as shown in FIG. 4. The resistance of the switch capacitor circuit can be denoted by Req, where Req=1/(fφ×C1). For example, fφ may represent the frequency (i.e., the switch frequency) of the first and second clock signals that are used to control switches K1 and K2, and C1 can represent the capacitance of capacitor C1 in the switch capacitor circuit.

The filter circuit formed by the switch capacitor circuit and filter capacitor C2 can be substantially equivalent to the RC low-pass filter, as shown in FIG. 4. If the capacitance of the filter capacitor is C2, the time constant of the filter capacitor in this example is RC=Req×C2=C2/(fφ×C1). In this case, fφ=n×fac, and C2=n2×C1, where "fac" represents the ripple frequency of the output current. Also, RC=n/fac=n×Tac, where "Tac" represents the ripple cycle of the output current.

An improved filter result can be obtained by setting "n" to be an integer greater than or equal to 5, and less than or equal to 20. For example, if ripple frequency "fac" of the output current is about 100 Hz, and taking n=10 as an example, the frequency fφ of the first and second clock signals that control switches K1 and K2 is 1 kHz, the capacitance of filter capacitor C2 is C2=n2×C1=1000 pF, and the capacitance of capacitor C1 is C1=10 pF, so low-pass filtering can be obtained with an RC time constant of 100 ms. In this way, the capacitance values in the low-pass filter circuit can be significantly reduced as compared to other approaches such that all of the ripple low-pass filter circuit components can be integrated into a single chip.

Referring back to FIG. 1, at 103 an error compensation signal can be generated by amplifying an error between the sense voltage signal and the filter voltage signal, in order to compensate and regulate the output current. The error compensation signal can be generated by comparing the sense voltage signal against the filter voltage signal through an error amplifying circuit (e.g., GM), to compensate/regulate the output current in order to substantially eliminate the ripples. The output current can thus be a constant DC current without any substantial AC component. In this way, the filter circuit can be implemented with the switch capacitor circuit and the filter capacitor, and all of the capacitors in the filter circuit may have relatively low capacitance values to facilitate chip integration.

The examples of FIGS. 2 and 3 can include a sampling circuit, a filter circuit, and an error amplifying circuit. For example, the sampling circuit can sample the output current flowing through the load in order to generate the sense voltage signal (e.g., at the common node between sampling resistor Rs and the source of power transistor Q). The filter circuit can include a switch capacitor circuit controlled by clock signals and including a filter capacitor. For example, the switch capacitor circuit can be substantially equivalent to the RC filter circuit that includes resistor R and filter capacitor C, shown in FIG. 4. The input terminal of the filter circuit can connect the output terminal of the sampling circuit, and the filter circuit can generate a filter voltage signal by filtering the sense voltage signal.

The output terminal "out" of the filter circuit can connect to the noninverting input terminal of the error amplifying circuit via supply Vos. Also, an inverting input terminal of the error amplifying circuit can connect sense voltage signal Vs. The error amplifying circuit can amplify an error between the sense voltage signal and the filter voltage (output) signal, and may generate an error compensation signal. The error compensation signal can be used to compensate the output current flowing through the load in order to substantially eliminate the ripples, and to obtain a constant DC current without an AC component.

For example, the error amplifying circuit can be implemented by error amplifier GM, and the sampling circuit can include sampling resistor Rs to generate sense voltage signal Vs by sampling the output current. The ripple filter circuit can include power switch Q (e.g., a MOS transistor) with a drain connected to a load, and a source connected to sampling resistor Rs. The common node "S" of sampling resistor Rs and power switch Q can be configured as an output terminal of sampling resistor Rs, at which sampling voltage Vs is generated. Sense voltage signal Vs can thus be in direct proportion to the output current (Iout), where Iout=Ids=Vs/Rs, and Ids is the current flowing through power switch Q. The gate of power switch Q can connect to the output terminal of error amplifier GM. Error amplifier GM can generate an error compensation signal to regulate current Ids of power switch Q. In this way the output current can be regulated, and the ripples can be substantially eliminated in order to obtain a constant DC current without any substantial AC component.

In this example, power switch Q is implemented by a MOS transistor having a drain connected to the load, a source connected to the sampling resistor, and a gate connected to an output terminal of the error amplifying circuit. Based on MOS transistor operating principles, the current flowing through the MOS transistor can be regulated by the gate-source voltage. Thus, the gate-source voltage can be controlled by regulating the gate voltage of the MOS transistor according to the error compensation signal. Also, power switch Q can remain on under the driving of the error compensation signal when error amplifier GM operates normally. Voltage source Vos with voltage value Vos1 can connect in series between the noninverting input terminal of error amplifier GM and an output of the filter circuit. Thus, the filter voltage signal generated by the filter circuit may be added with voltage value Vos1 prior to being provided to the noninverting input terminal of error amplifier GM. Therefore, the voltage at the noninverting input terminal of the error amplifier may be greater than voltage Vs at the inverting input terminal in order to guarantee that the error compensation signal generated by error amplifier GM is high to initially turn on power switch Q.

As an example with reference to FIG. 3, the ripple filter circuit can include comparator CMP, switch K3, and capacitor C3. For example, the inverting input terminal of comparator CMP can connect to the drain of power switch Q to receive drain voltage VD thereof. The noninverting input terminal of comparator CMP can connect to the gate of power switch Q to receive gate signal VG thereof. An output terminal of comparator CMP can connect the control terminal of switch K3, to control the switching states of switch K3. Switch K3 can connect between filter capacitor C2 and capacitor C3 in the filter circuit. A terminal of capacitor C3 can connect to switch K3, and another terminal thereof can connect to ground.

When the voltage at the noninverting input terminal of comparator CMP is greater than the voltage at the inverting input terminal, comparator CMP may output a high on signal Vcmp to turn on switch K3. In this case, filter capacitor C2 and capacitor C3 are effectively connected in parallel, and a portion of the energy stored in filter capacitor C2 may be discharged to capacitor C3 as part of charge sharing between the two capacitors. Filter capacitor C2 can charge capacitor C3 so as to slowly reduce the voltage across filter capacitor C2. The voltage at the noninverting input terminal of error amplifier GM may slowly be reduced, and as a result the error compensation signal VG generated by error amplifier GM may also be gradually reduced. This can continue until error compensation signal VG equals a minimum value (e.g., the valley value) of drain voltage VD of power switch Q in a switching cycle during the steady state. In some cases, the "equal" here may actually fluctuate near the valley value. In this way, the voltage difference between the two input terminals of error amplifier GM can be reduced due to charge accumulation, and this may improve the error compensation accuracy of the output current. Thus, the circuit may gradually be in a steady state as error compensation signal VG gradually reaches the valley value of sense voltage signal VD.

Referring again to FIG. 2, voltage source Vth with a voltage value of Vth0 can connect between the drain of power switch Q and the inverting input terminal of comparator CMP, and Vth0≤Vthq, where Vthq is a conduction threshold voltage of power switch Q. The error compensation signal VG input to power switch Q and drain voltage VD may be greater than Vth0, and a portion of the energy stored in filter capacitor C2 may be gradually released to lower error compensation signal VG. This can guarantee that power switch Q operates in a saturation mode by regulating the difference between error compensation signal VG and the valley value of drain voltage VD of power switch Q to be substantially equal to voltage value Vth0. In this way, the voltage difference between the two input terminals of error amplifier GM can be reduced due to charge accumulation, and may improve the error compensation accuracy of the output current. This can also maintain power switch Q in a saturated conduction state, which can improve the stability of the ripple filter circuit.

Figure 5:
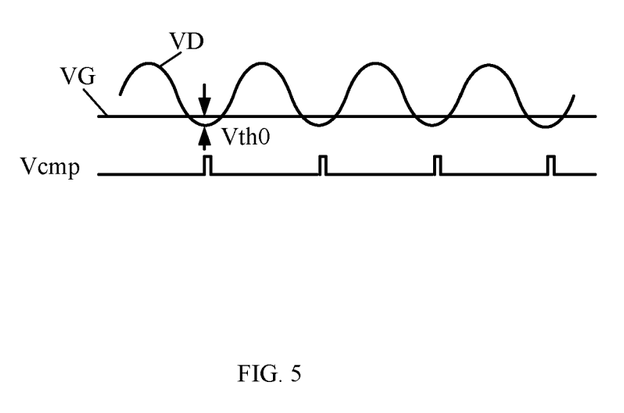
FIG. 5 is a waveform diagram of example operating signals, in accordance with embodiments of the present invention.

Referring now to FIG. 5, shown is a waveform diagram of example operating signals, in accordance with embodiments of the present invention. In this particular example, voltage source Vth can be Vth0=Vthq, and when VG−VD>Vthq, a portion of the energy stored in filter capacitor C2 may be released through capacitor C3. Thus, the difference between voltage VG and the valley value of voltage VD may substantially equal threshold voltage Vthq of power switch Q. This can guarantee that power switch Q operates in a critical saturation condition, and can further minimize power losses on power switch Q and sampling resistor Rs. Shown in FIG. 5 are example waveforms of voltage signal VG, voltage signal VD, threshold voltage Vth0, and output signal Vcmp generated by comparator CMP.

Referring back once again to FIGS. 2 and 3, the ripple filter circuit can also include switch K4 with a terminal connected to a common node of capacitor C3 and switch K3, and another terminal connected to ground. The control signal of switch K4 can be opposite to that of switch K3. When switch K3 is turned on, switch K4 may be turned off, and the energy stored in filter capacitor C2 can be discharged via charge sharing to capacitor C3. For example, when the voltage at the noninverting input terminal of comparator CMP is less than the voltage at the inverting input terminal, switch K3 can be turned off, and switch K4 may be turned on. In this case, so capacitor C3 can be shorted to ground to discharge capacitor C3. In this way, the energy stored in filter capacitor C2 may be released through capacitor C3 when switch K3 is turned on and switch K4 is turned off. In addition, an inverter "NOT" can connect between an output terminal of comparator CMP, and the output signal of inverter NOT can control switch K4.

Figure 6:
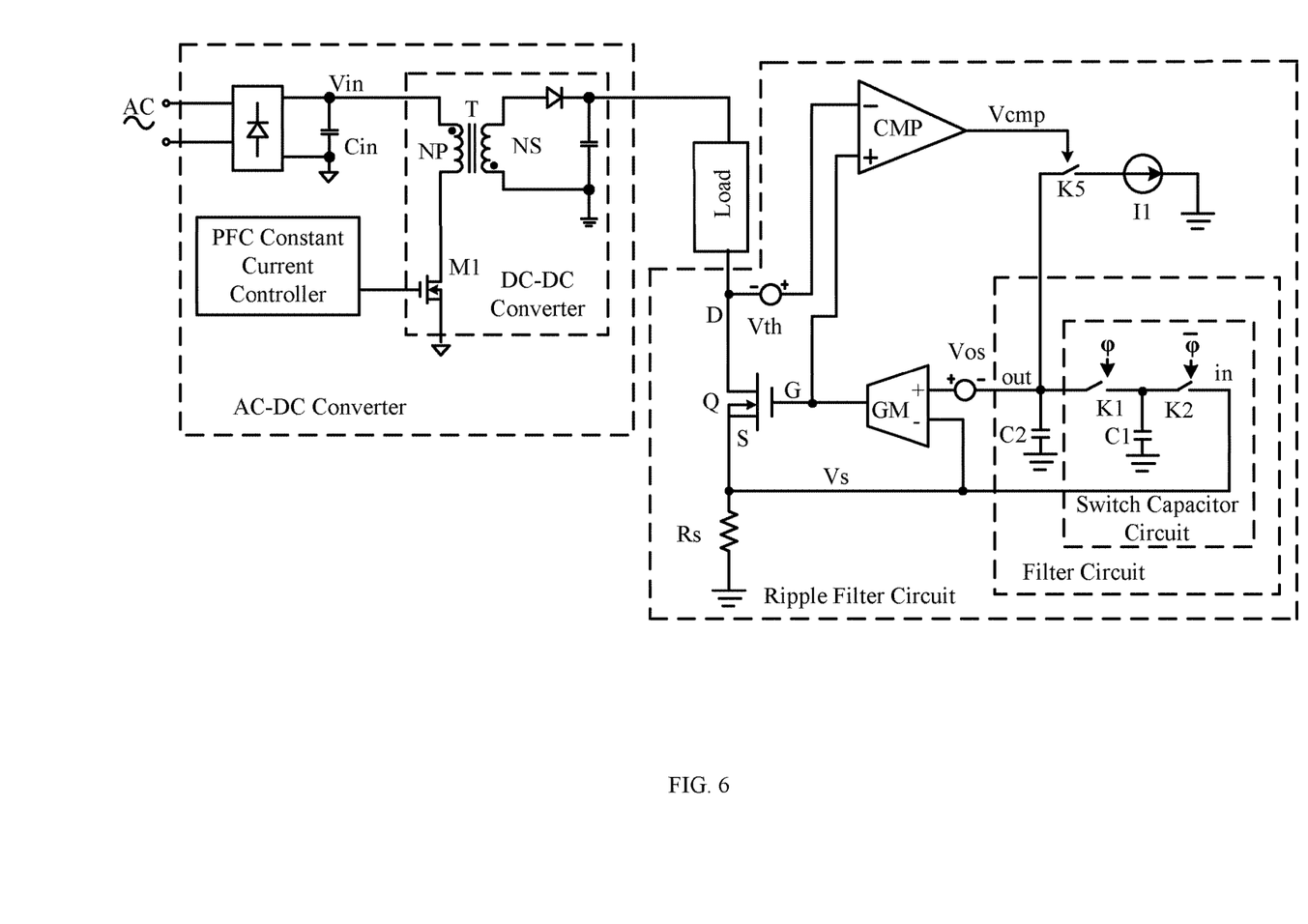
FIG. 6 is a schematic block diagram of a third example ripple filter circuit, in accordance with embodiments of the present invention.

Referring now to FIG. 6, shown is a schematic block diagram of a third example ripple filter circuit, in accordance with embodiments of the present invention. In this particular example, the ripple filter circuit can regulate the charge of filter capacitor C2 according to the gate-drain voltage of power switch Q. This example ripple filter circuit can include comparator CMP, switch K5, and current source I1. The inverting input terminal of comparator CMP can connect via voltage source Vth to the drain of power switch Q and to the load. The noninverting input terminal of comparator CMP can connect to the gate of power switch Q, and the output terminal can control switch K5.

A terminal of switch K5 can connect between node "out" of filter capacitor C2 and the positive pole of current source I1. A control terminal of switch K5 can connect to the output terminal of comparator CMP, and the negative pole of current source I1 can connect ground. In this example, the electric charge of filter capacitor C2 can be regulated according to the gate-drain voltage of power switch Q. When the voltage at the noninverting input terminal of comparator CMP is greater than the voltage at its inverting input terminal, comparison signal Vcmp can be high to turn on switch K5. In this case, the energy stored in filter capacitor C2 can be gradually discharged through a discharge loop that includes switch K5 and current source I1 until error compensation signal VG substantially equals to the minimum value (e.g., the valley value) of drain voltage VD of power switch Q (e.g., in a switching cycle in the steady state).

In this example, the discharge current of filter capacitor C2 can be controlled by current source I1. Therefore, this approach can facilitate control the discharge current of filter capacitor C2, in order to control the electric charge of filter capacitor C2. In some cases, the released electric charge of filter capacitor C2 may match with charge accumulation by controlling the discharge current and the discharge time. This can make the voltage decrease caused by releasing the electric charge correspond to the voltage increase caused by charge accumulation. In this way, the ripple filter circuit can be controlled to operate in a steady state, and as a result, the output current can be a substantially constant DC current without AC components.

Figure 7:
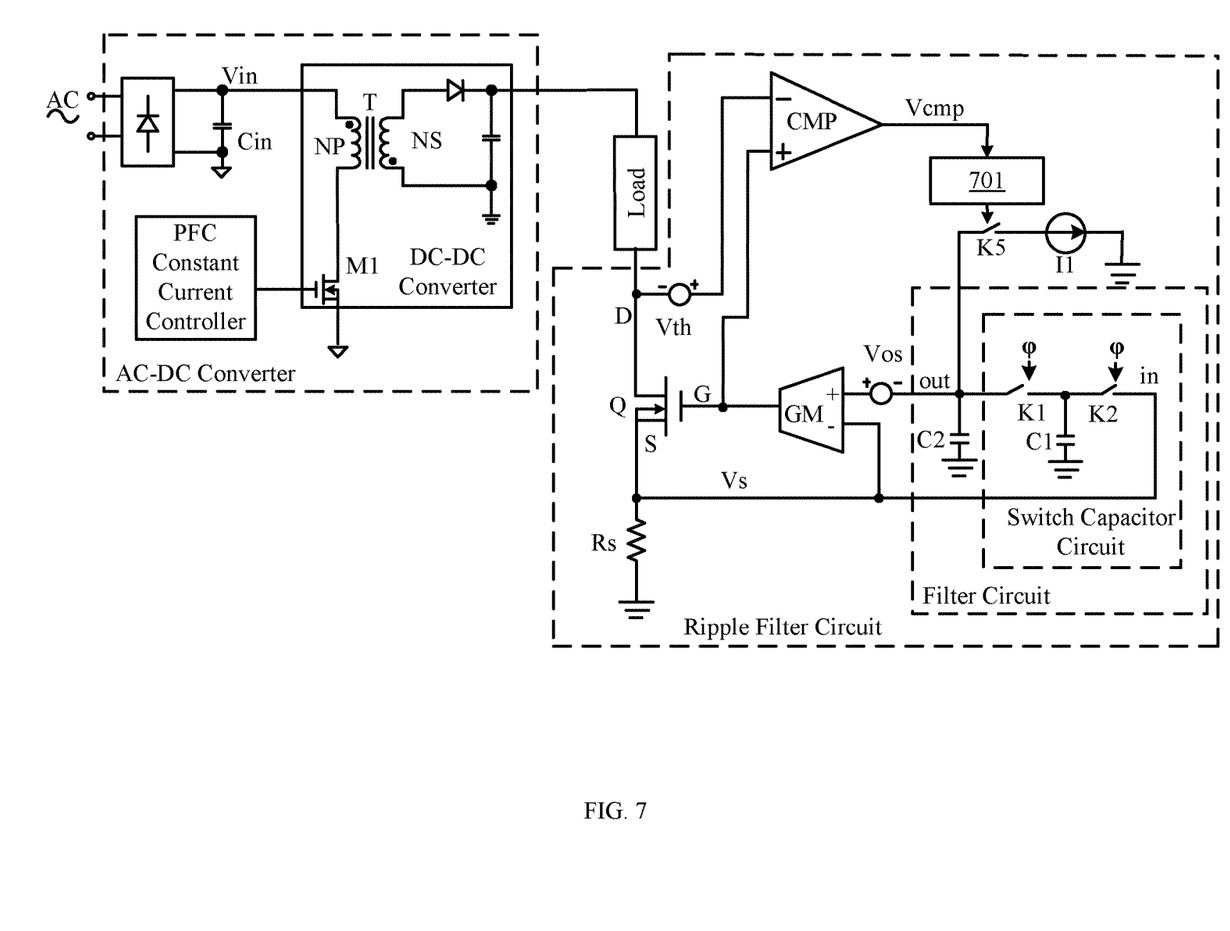
FIG. 7 is a schematic block diagram of a fourth example ripple filter circuit, in accordance with embodiments of the present invention.

Referring now to FIG. 7, shown is a schematic block diagram of a fourth example ripple filter circuit, in accordance with embodiments of the present invention. In this particular example, the ripple filter circuit can include pulse width signal generator 701. Pulse width signal generator 701 can connect between the output terminal of comparator CMP and the control terminal of switch K5. Pulse width signal generator 701 can generate a pulse signal "VK5" with a plurality of predetermined cycles in order to control switch K5 when the difference between error compensation signal VG and drain voltage VD of power switch Q is greater than threshold voltage Vth.

Figure 8:
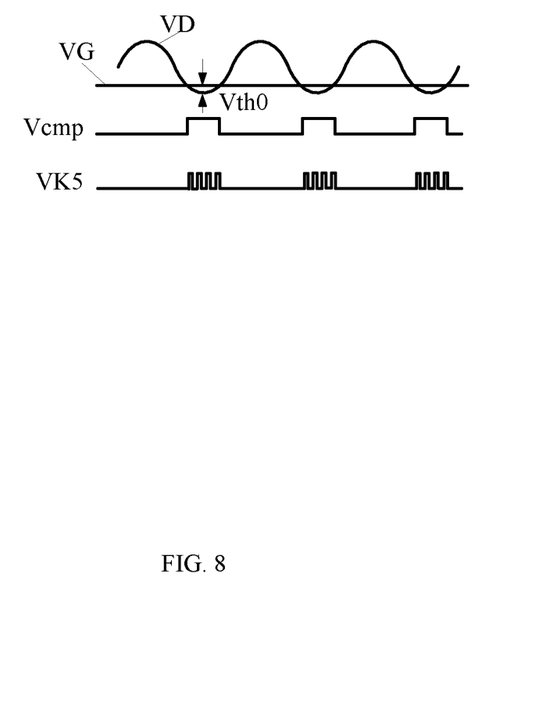
FIG. 8 is a waveform diagram of additional example operating signals, in accordance with embodiments of the present invention.

Referring now to FIG. 8, shown is a waveform diagram of additional example operating signals, in accordance with embodiments of the present invention. When the difference between error compensation signal VG and drain voltage VD of power switch Q is greater than threshold voltage Vth, output signal Vcmp of comparator CMP can be high, and pulse signal generator 701 may generate pulse signal VK5. For example, the cycle of pulse signal VK5 may be less than that of output signal Vcmp, and switch K5 can be controlled by pulse signal VK5. If switch K5 is turned on when pulse signal VK5 is high, filter capacitor C2 may be discharged by current source I1. After a time period, when pulse signal VK5 is low, switch K5 may be turned off to stop the discharging of filter capacitor C2. However, filter capacitor C2 may still be discharged for a while when pulse signal VK5 again goes high.

In this way, filter capacitor C2 may gradually and intermittently be discharged in a plurality of relatively small time intervals until error amplifier GM operates in the steady state. The difference between error compensation signal VG and drain voltage VD of power switch Q can be substantially equal to voltage value Vth0. Thus, in addition to the discharging current of filter capacitor C2 being controlled by a current source, the discharge time thereof can also be controlled. This can accurately control the discharge electric charge in order to prevent normal operation of the circuit from being affected by "flash" caused by inadequate discharge electric charge. In this way, an improved filter result can be achieved with for simplified circuitry and control, and the output current can be a substantially constant DC current without any AC component.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of filtering a ripple signal, the method comprising:
    a) generating, by a filter circuit, a filter voltage signal by filtering a sense voltage signal representing a driving current flowing through a load, wherein said filter circuit comprises a switch capacitor circuit and a filter capacitor; and
    b) generating, by an error amplifying circuit, an error compensation signal by amplifying a difference between said sense voltage signal and said filter voltage signal, wherein said error compensation signal is configured to compensate and regulate an output current flowing through said load by controlling a power switch that is coupled to said load and a sampling circuit.

2. The method of claim 1, further comprising controlling said switch capacitor circuit by a clock signal having a frequency proportional to a frequency of said output current.

3. The method of claim 1, further comprising turning on said power switch in an initial state by said error compensation signal.

4. The method of claim 1, further comprising releasing a portion of electric charge from said filter capacitor when a difference between said error compensation signal and a voltage at a drain of said power switch is greater than a predetermined threshold voltage, wherein said predetermined threshold voltage is less than or equal to a conduction threshold voltage of said power switch.

5. The method of claim 4, wherein said releasing said portion of said electric charge of said filter capacitor comprises charge sharing with a first capacitor.

6. The method of claim 5, wherein said charge sharing with said first capacitor comprises using a current source.

7. A ripple filter circuit, comprising:
    a) a controllable current source coupled in series to a load to receive a driving current having a DC component and a ripple component;

b) a filter circuit configured to generate a filter voltage signal that represents said DC component; and c) an error amplifying circuit configured to generate an error compensation signal by amplifying an error between a sense voltage signal that represents said driving current and said filter voltage signal, wherein said error compensation signal is configured to control an output current of said controllable current source to be consistent with said ripple component.

8. The ripple filter circuit of claim 7, wherein said filter circuit comprises a switch capacitor circuit having a first switch controlled by a first clock signal, and a first capacitor coupled in series between said sense voltage signal and ground.

9. The ripple filter circuit of claim 8, wherein a frequency of said first clock signal is proportional to a ripple frequency of said driving current.

10. The ripple filter circuit of claim 8, wherein said filter circuit further comprises a second switch controlled by a second clock signal that is complementary with said first clock signal, and a second capacitor coupled in series between ground and a common node between said first switch and said first capacitor.

11. The ripple filter circuit of claim 7, further comprising a first voltage source coupled between an input terminal of said error amplifying circuit and an output terminal of said filter circuit, wherein said error compensation signal is high in an initial state to turn on said power switch.

12. The ripple filter circuit of claim 7, wherein said controllable current source is configured as a power switch operating in a linear mode.

13. The ripple filter circuit of claim 12, further comprising a sampling circuit, and wherein said load, said power switch, and said sampling circuit are coupled in series in sequence between said driving current and ground.

14. The ripple filter circuit of claim 13, wherein said power switch comprises a MOS transistor having a drain being coupled to said load, a source coupled to said sampling circuit, and a gate coupled to an output of said error amplifying circuit.

15. The ripple filter circuit of claim 12, further comprising a control circuit having a first input terminal coupled to a common node between said load and said power switch, a second input terminal coupled to said output terminal of said error amplifying circuit, and an output terminal coupled to output of said filter circuit, wherein said control circuit is configured to control said error compensation signal to be consistent with a valley value of the voltage at said common node between said load and said power switch.

16. The ripple filter circuit of claim 15, wherein said control circuit further comprises:

a) a comparator having a first input terminal coupled to a first terminal of said power switch, and a second input terminal coupled to a control terminal of said power switch, and being configured to generate a comparison control signal to control a first switch; and b) a first capacitor coupled to said first switch and ground, wherein said first switch is coupled between said filter capacitor and said first capacitor, wherein a portion of energy stored in said filter capacitor is released through said first capacitor said first switch is turned on by said comparison control signal.

17. The ripple filter circuit of claim 15, further comprising a first voltage source coupled between said common node between said power switch and said load, and said first input terminal of said control circuit, and having a voltage value that is less than or equal to a conduction threshold voltage of said power switch.

18. The ripple filter circuit of claim 15, further comprising a second switch coupled to ground and a common node of said first capacitor and said first switch, and another terminal coupled to a ground, wherein said first switch is off and said second switch is on to release said energy stored in said first capacitor when a voltage at a second input terminal of said comparator is less than a voltage at a first input terminal of said comparator.

19. The ripple filter circuit of claim 15, further comprising:

a) a comparator having a first input terminal coupled to a first terminal of said power switch, and a second input terminal coupled to a control terminal of said power switch, and being configured to generate a comparison control signal; and b) a first switch being controllable by said comparison control signal and having a first terminal coupled to a common node of said filter capacitor and a second input terminal of said error amplifier, and a second terminal coupled to a positive pole of a current source, wherein a negative pole of said current source is coupled to ground, wherein energy stored in said filter capacitor is released through said current source when a voltage at said second input terminal of said comparator is greater than a voltage at said first input terminal of said comparator.

20. The ripple filter circuit of claim 19, further comprising a pulse width signal generator coupled between an output of said comparator and a control terminal of said first switch, wherein said pulse width signal generator is configured to generate a pulse signal with a plurality of predetermined cycles to control said first switch.

* * * * *